United States Patent [19]
Morin

[11] Patent Number: 5,622,249
[45] Date of Patent: Apr. 22, 1997

[54] CONVEYOR BELT SCRAPER

[76] Inventor: Normand J. Morin, 143 A Gibson Street, Parry Sound, Canada, ON P2A 1Y1

[21] Appl. No.: 411,801
[22] PCT Filed: Oct. 13, 1993
[86] PCT No.: PCT/CA93/00406
  § 371 Date: Apr. 10, 1995
  § 102(e) Date: Apr. 10, 1995
[87] PCT Pub. No.: WO94/08875
  PCT Pub. Date: Apr. 28, 1994

[30] Foreign Application Priority Data

Oct. 13, 1992 [GB] United Kingdom ............ 9221426

[51] Int. Cl.[6] ................................ B65Q 45/12
[52] U.S. Cl. .................... 198/499; 15/256.6
[58] Field of Search ................... 198/499, 498, 198/497, 494, 493; 15/256.5, 256.51, 256.6, 250, 361

[56] References Cited

U.S. PATENT DOCUMENTS

| | | |
|---|---|---|
| 2,545,882 | 3/1951 | Hall . |
| 4,189,046 | 2/1980 | Ward .................. 198/499 |
| 4,365,706 | 12/1982 | Bright ................ 198/499 |
| 4,402,394 | 9/1983 | Stoll .................. 198/499 |
| 4,877,122 | 10/1989 | Morin ................. 198/499 |
| 4,936,439 | 6/1990 | Alexander, Jr. et al. .... 198/499 |

FOREIGN PATENT DOCUMENTS

| | | | |
|---|---|---|---|
| 3624623 | 3/1987 | Germany ............ 198/499 |
| 13326 | 1/1989 | Japan ................ 198/499 |
| 882879 | 11/1981 | U.S.S.R. ............ 198/499 |
| 1239051 | 1/1986 | U.S.S.R. ............ 198/499 |
| 2163715 | 3/1986 | United Kingdom . |
| 2165200 | 4/1986 | United Kingdom . |

Primary Examiner—Frank E. Werner
Attorney, Agent, or Firm—Anthony Asquith & Co.

[57] ABSTRACT

For scraping caked dirt from conveyor belts in mines. The scraper blade is coiled inside a housing, and during operation is locked to the housing. For wear adjustment, the blade is advanced out of the housing towards the belt: in the preferred embodiment, water is injected into the housing, which forces the blade, piston-like, out of a slot in the housing. The housing is mounted on a suspension system attached to the belt fixed frame, and the housing can bounce and rebound freely to cater for belt thickness variations, etc.

16 Claims, 6 Drawing Sheets

CONVEYOR BELT SCRAPER

This invention relates to belt scrapers, being scrapers of the kind used to scrape caked material from conveyor belts.

BACKGROUND TO THE INVENTION

Conveyor belts are in common use in mines for the transport of ore and debris to and from crushing and milling machines and the like. A problem with conveyor belts is that dust and fine particles of crushed ore and debris can become caked very firmly indeed to the belt, especially if moisture is present. The caked material is not necessarily worthless dirt, but may contain valuable minerals, including gold dust; it is important to scrape the blade clean, not just for the sake of cleanliness, but in order not to waste valuable material.

Scraping caked material from mine conveyor belts is well-known to be a most demanding task. The designer usually approaches the task on the basis of pressing a scraper blade against the (moving) face of the belt. The scraper blade gradually wears down under the abrasive conditions, and one of the problems of belt-scraping lies in providing a scraper blade of sufficient length that the blade has a long service life between replacements.

Another of the problems associated with belt scrapers arises because the belt is not of a uniform thickness. For example, at the joints between sections of the length of the belt the overall thickness of the belt can be greater, which can cause the scraper to "bump" as the belt-joint passes the scraper.

The scraper blade should be able to retract to accommodate this bump; if it cannot retract, the blade (and the belt) may be damaged. It is preferable that this retraction movement, if the scraper is to accommodate the bump easily, be not accompanied by friction, i.e., that the retraction and recovery movement, or the bounce and rebound, should be hysteresis-free.

It is a first aim of the invention to provide a scraper assembly in which the force applied between the scraper blade and the belt remains at a substantially constant or uniform level, even though the scraper may be bouncing and bumping towards and away from the belt, for example because of variations in the thickness of the belt. Bumping and bouncing can also be caused by debris that sticks to the belt with varying intensities of adherence.

It is a second aim of the invention to provide a means for adjusting the position of the scraper blade, relative to the blade housing, to compensate for the gradual wearing away of the blade. Preferably, it is an aim that the adjustment be automatic.

BASIC FEATURES OF THE INVENTION

The invention consists in a conveyor belt scraper apparatus, suitable for use with a conveyor belt which is travelling with respect to a fixed frame, having the following characteristics.

The scraper blade is arranged for direct scraping contact with the belt, and is mounted in a housing. In one form of the invention, the housing is mounted for movement in a suspension means, the movement being in the direction towards and away from the belt. In this case, where the housing is suspended, the arrangement is such that an actuator presses the suspended housing, together with the blade, against the conveyor belt.

The actuation force pushes the housing and the blade together against the belt. The reaction to this force is supported by a suitable reaction means. The arrangement of the reaction means might involve pushing the scraper against the belt, the reacting that force against something solid. The reaction means is solid in the case where the reaction means comprises a reaction roller with a fixed axle, positioned on the other side of the belt, directly opposite the blade. The reaction means is solid also in the case where the reaction means comprises the head pulley of the belt. The housing and scraper blade can be pushed against the head pulley very hard, with virtually no deflection of the belt.

On the other head, it may be preferred for the reaction means to have a little "give", in which case the reaction means can include a resilient component for reacting the scraper actuation load. One way in which the reaction means can be given a little resilient "give" is to provide a solid reaction roller but to somewhat misalign the roller with respect to the scraper blade.

One of the advantages of the invention may be regarded as follows: because the blade is coiled, a blade of a very long length can be accommodated; because the blade is long, the material of the blade can be allowed to wear at a relatively rapid rate, and yet the scraper will have an adequate service life; because a rapid wear rate can be accommodated, the blade can be of soft material and can be pressed hard against the belt. The harder the blade is pressed against the belt, in general, the more the blade conforms to the belt and the more efficient the scraping.

Arising from the above factors, because it is desirable to press the blade very hard against the belt, and indeed because the blade can accommodate being pressed very hard against the belt, the preference arises therefore to push through the belt against some solid means, such as, for example, the head pulley. However, the more forcefully the blade is pressed against the solid means, the more vulnerable the scraper is to even a small bump in the belt (or in the pulley). The invention is aimed at so mounting the scraper that the blade can press the belt hard against the solid means, and yet, because of the design of its suspension system, the scraper is easily able to accommodate passing bumps.

As explained, when the blade is long, the blade can be soft and can be pressed hard against the head pulley or other solid means; when the blade is pressed hard against the solid means, the scraper is exposed even to small passing bumps. The suspension system as described herein permits those bumps to be accommodated without damage to the scraper, which again may be understood as contributing to the desired result, ie a scraper with a soft blade which can be pressed very hard against the belt.

In the case where it is the housing that undergoes suspension movement, the housing is mounted on a suspension means, and the suspension means is mounted on the fixed frame. The suspension means is effective to guide the housing for movement of the housing towards and away from the belt, and is effective to constrain the housing against movement of the housing along the length of the belt, and in all other modes.

The apparatus includes an operable actuator, which is effective, when operated, to provide an actuation force on the housing urging the housing in the direction towards the belt.

The apparatus includes an operable adjuster, which is suitable for adjusting the position of the blade relative to the housing, in the direction towards the belt, and the adjuster is effective, when operated, to advance the blade relative to the housing in the direction towards the belt. The adjuster is operable, preferably automatically, in response to an approach of the housing closer than a predetermined datum distance from the belt.

The adjuster is effective, when operated, to advance the blade relative to the housing in the direction towards the belt. As the blade is forced out of the housing, the blade cannot move forwards towards the belt since the blade is already in contact with the belt. Therefore, operating the adjuster is effective not so much to push the blade forward as to push the housing backwards, away from the belt, by reaction.

The actuation force preferably remains ON the housing during adjustment, and preferably, the actuation system is such that the actuation force remains the same when the housing is retracted, after adjustment, as when the housing was close to the belt.

The adjuster is operable automatically in response to an approach of the housing closer than a predetermined datum distance from the belt. Preferably, a distance sensor is provided, which signals the adjuster that adjustment is required.

Preferably, the actuation force should remain ON during adjustment. Therefore, the force that advances the blade out of the housing must therefore be sufficient to overcome the actuation force, since the actuation force is acting to drive the blade into the housing.

Thus, in the invention the nature of the mounting between the blade and the housing must be such that the blade remains fixed within the housing during normal operation of the apparatus. It is arranged that, during actuation, the blade protrudes from the housing towards the belt, and the blade cannot retract into the housing. The actuator, in forcing the housing towards the belt, presses the blade into the belt.

As any bumps or the like on the belt go travelling by, the blade must deflect away from the belt. As described, the blade cannot retract into the housing; the housing, on its suspension system, is the component that retracts. That is to say, the blade and the housing retract together, as an integral whole unit, to accommodate bumps in the belt.

The benefit of this suspension system is that the blade is not called upon to move within its seal in the housing. The scraper blade does not stroke through the housing seal during bumps and rebounds and normal actuation of the housing: the blade only moves through the seal during adjustment movement.

In the other form of the invention, the apparatus includes a reaction member for reacting forces arising from the actuator. Now, the actuator is effective, when operated, to provide an actuation force between the housing member and the reaction member, being a force which acts in the direction to nip the belt between the housing member and the reaction member.

One of either the housing member or the reaction member is mounted on a suspension means, and the suspension means is mounted on the fixed frame.

Whichever of the housing member or the reaction member is the one that can undergo suspension movement is referred to as the suspension member. The suspension means is effective to guide the suspended member for movement of the member towards and away from the belt, and is effective to constrain the suspended member against movement of the member along the length of the belt.

The apparatus includes an operable adjuster, which is suitable for adjusting the position of the blade relative to the housing, in the direction towards the belt. The adjuster is effective, when operated, to advance the blade relative to the housing in the direction towards the belt. The adjuster is operable automatically in response to an approach of the suspended member closer than a predetermined datum distance from the belt, and the adjuster is effective, when operated, to advance to blade relative to the housing, in the direction towards the belt.

It can be arranged that the adjuster, when operated, is effective to advance the blade relative to the housing in a substantially sudden manner. That is to say, although the housing gradually approaches the belt as the blade wears, over a period, for example, of a few hours or days of belt operation, it is preferred that the adjuster suddenly, eg within a few seconds, acts to force the advancement of the blade out of the housing. Or, it may be arranged that the adjuster acts much more frequently, but in smaller steps.

Preferably, the apparatus includes a blade mounting means, which is effective to mount the blade with respect to the housing in such a manner that, except when the adjuster is operated, the blade mounting means constrains the blade against movement of the blade relative to the housing in the direction away from the belt.

Preferably, the actuator and the suspension means are effective to maintain substantially constant the actuation force on the housing, in a substantially hysteresis-free manner, and substantially irrespective of the distance of the housing from the belt.

Preferably, the adjuster is effective, when operated, to advance the blade with respect to the housing substantially without interruption to the continuing operation of the actuation means.

Preferably, the adjuster includes a distance sensor, which is effective to sense the distance of the housing from the belt, and a means for operating the adjuster in response to a signal from the distance sensor that the housing is closer to the belt than a predetermined datum distance. The invention is not limited to a particular form of distance sensor, which can be mechanical, optical, electromagnetic, etc The distance sensor and the adjustment system should be set up so as to keep the housing quite close to the belt. If the blade is allowed to protrude a long way out of the housing, the blade might tend to be folded over by the moving belt. The blade is, of course, made of a flexible material. Where the blade is, for instance, 7 mm thick, it should not be allowed to protrude from the housing more than about 6 mm in the worst out-of-adjustment condition.

In a preferred form of the invention, the housing defines a hollow chamber, and the blade is housed within the hollow chamber. The housing includes a slot, and the blade protrudes from the slot. The apparatus includes a water-tight seal at the slot which is effective to seal the blade to the housing, and the space within the hollow chamber not occupied by the blade is filled with water.

When the apparatus is of the kind, as just described, in which the housing is filled with water, preferably the adjuster includes a water injector, which is effective to inject, upon operation of the adjuster, a charge of water under pressure into the hollow chamber. The charge of water entering the chamber displaces from the chamber, and through the slot, a portion of the blade, being a portion of the blade having a volume equal to that of the charge of water injected.

Preferably, the hollow chamber is provided with a check valve means, which is effective, when the unit is in operation, to prevent water passing out of the hollow chamber.

The invention permits the designer to make the blade "conform" more closely to the changing thickness of the moving belt, during both bounce and rebound. As a result, the designer can position the blade so as to press against the belt at a position where the belt is backed solidly, as by a pulley, for example. If the blade were not able to bounce and rebound without hysteresis, the blade could not be placed so close to a solidly-mounted pulley, but would have to be placed away from the pulley, along the run of the belt, where the belt itself can deflect of need be. When the designer is forced to located the blade away from the pulley, the blade cannot be pressed hard against the belt (because the belt itself deflects).

In the invention, the blade can be actuated or pressed very hard against the belt; or rather, that is to say, the blade can be pressed very hard against the reaction means, ie the pulley or other thing mounted solidly behind the belt. This means that the scraper of the invention can be very efficient at scraping the belt clean of caked-on dirt.

However, one of the problems that then arises from having a strong actuation force, and of pressing the blade hard against the belt, is that the blade material wears comparatively quickly. That is why, when the scraper apparatus is such that a high pressure obtains between the blade and the belt, the designer should make provision for automatic adjustment of the blade, to compensate for the relatively rapid wear. Whilst manual adjustment might be acceptable for a conventional low-pressure scraper, a high pressure scraper really demands that the adjustment be automatic, as manual adjustment would require attention from an operator perhaps too frequently to be economical.

The invention is aimed at providing a scraper assembly in which the scraper blade can be pressed hard against the belt, without causing damage to any of the components of the scraper (nor to the belt). Also, the invention is aimed at providing a scraper which has a very long service life, even though the scraper pressure is high. Preferably, the invention is also aimed at providing a scraper in which, even though the scraper pressure is high, and the service life is long, the scraper requires no attention (apart from periodic inspection), until the blade is quite worn out.

DETAILED DESCRIPTION OF PREFERRED EMBODIMENT

By way of further explanation of the invention, exemplary embodiments of the invention will now be described with reference to the accompanying drawings, in which:

FIG. 6 is an end elevation of yet another belt scraper assembly;

Apparatuses shown in the accompanying drawings and described below are examples which embody the invention. It should be noted that the scope of the invention is defined by the accompanying claims, and not necessarily by specific features of exemplary embodiments.

Figure 1:
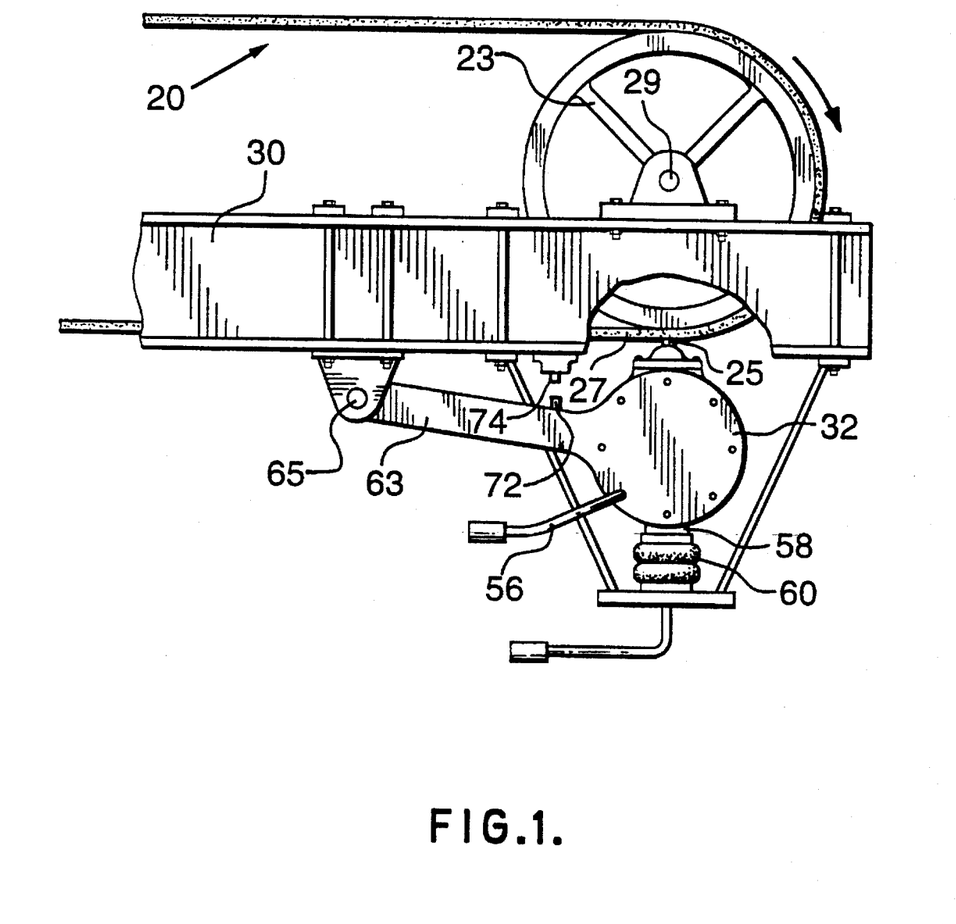
FIG. 1 is a side elevation of a conveyor belt, to which is applied a belt scraper assembly which embodies the invention.

FIG. 1 shows a conveyor belt system, of the kind used in ore-processing machinery, and in materials-handling machinery generally, in a mine. The belt 20 carries particles of rock and ore, which have been more or less finely broken and ground into dust. Such a conveyor belt acquires a coating of caked-on dirt and debris, which must be scraped off.

The belt 20 passes around a head pulley 23, and in accordance with usual practice the dirt coating is scraped off by means of a scraped blade 25 which presses against the belt, on the return run 27 of the moving belt 20, a small distance after the belt emerges from the pulley 23.

The pulley 23 is mounted for rotation in bearings 29, carried on a suitable member of a fixed frame 30.

Figure 2:
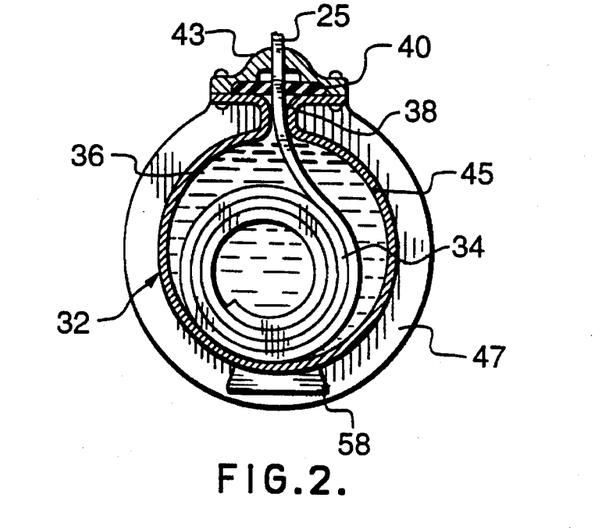
FIG. 2 is a cross-sectional end elevation of the assembly of FIG. 1.

As shown in FIG. 2, the blade 25 is carried within a housing 32. The blade is made of flexible material, and lies in a coil 34 inside the housing. This arrangement is based on that shown in U.S. Pat. No. 4,877,122 (MORIN, Oct. 31, 1989). The housing 32 is in the form generally of a cylinder, having a hollow interior chamber 36. The housing includes a slot 52 at the top, through which the blade 25 emerges from the housing. The blade 25 is sealed into the slot 52 by means of an elastomeric seal 40, and a buttress piece 43 provides physical support for the blade near its tip.

Figure 3:
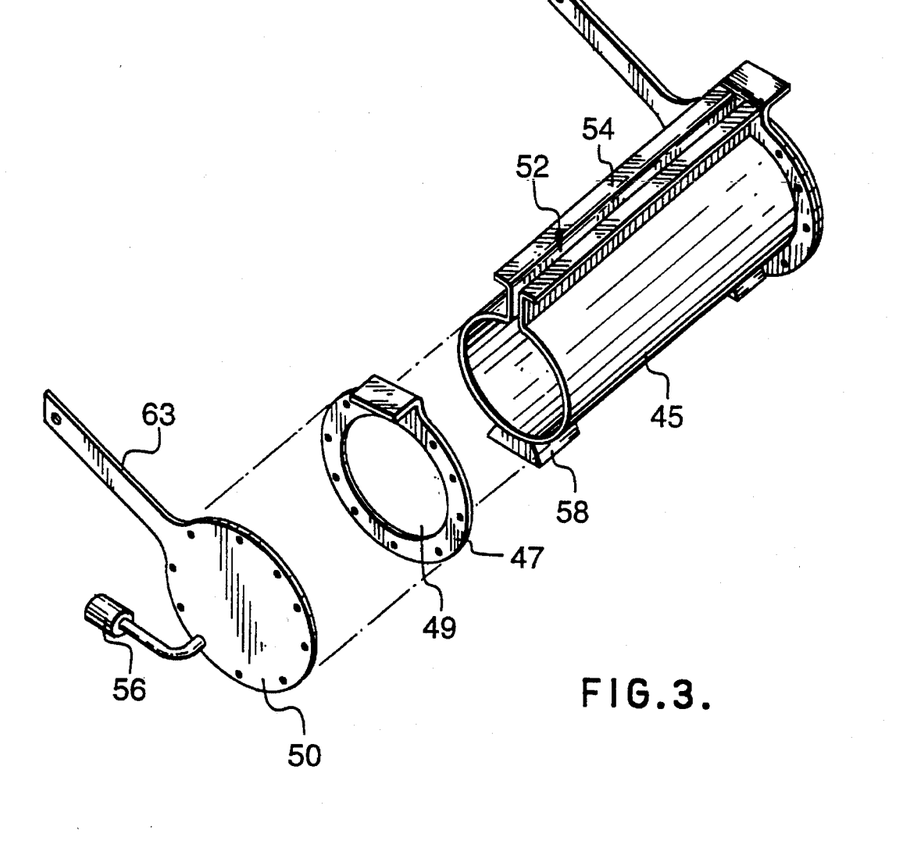
FIG. 3 is a pictorial view of some of the components of the assembly of FIG. 1.

FIG. 3 shows some details of construction of the housing 32. The main structure of the housing comprises a shell 45, which is of sheet steel, bent and formed to the profile indicated. At the ends of the shell 45 are respective trunnions 47, which are attached to the shell 45 by welding.

The trunnion 47 is provided with a central aperture 49, which matches the diameter of the shell 45, and provides access to the hollow interior 36 of the housing 32 (ie of the shell).

The aperture 49 in the trunnion 47 is closed by a cover 50, which is detachably secured by means of bolts to the trunnion.

The assembled housing 32, comprising the shell 45, the trunnions 47, and the bolted-on end covers 50, defines an open slot 52. The slot 52 is surrounded by a flat marginal land 54. The seal 40 resides upon the land 54, and the buttress piece 43 resides on the seal. When the buttress piece is bolted down to the land, the seal is clamped in place.

The coiled up blade 34 is placed inside the shell 45 through the aperture 49, the cover 50 being removed to permit this. This free end of the blade is fed through the slot 52, and through the seal 40. With the blade correctly inserted, and the covers 50 in place, the hollow interior 36 of the housing 32 is enclosed and sealed, and is watertight. (It should be noted that the seal 40 is illustrated in diagrammatic form; the actual seal must be quite carefully engineered if it is to keep the slot watertight in the very harsh environment of a mine conveyor belt, but that is not a feature of the present invention. To make the task of the seal as easy as possible, the designer should also see to it that the housing is of such solid construction that the slot 52 does not tend to spread open by more than a negligible amount when the housing is put under pressure.)

A pipe coupling 56 is adapted to receive a conduit from a suitable water supply, whereby water can be fed into the chamber 36. Prior to operation of the scraper, the housing is prepared by being filled with water. Air within the chamber should be expelled during filling, as water enters the chamber. This can be accomplished by physically manipulating the seal 40 so as to hold the lip of the seal out of contact with the blade, at least over a short length of the lip. Alternatively, a suitable conventional bleed valve may be provided for bleeding off the air as the housing fills with water.

When replacing a worn blade, it should be noted that the housing 32 will be almost completely full of water, and provision should be made for accommodating same when the cover 50 is removed.

The shell 45 is provided with suitable pads 58, whereby the housing 32 can receive actuation forces for pressing the housing upwards, towards the belt 20. The pads 58 are acted upon from below by pneumatic rams 60. The rams 60 preferably are of the type used for air-springs, as commonly found in truck suspension systems. (The invention is not limited, however, to this particular type of actuator.) The rams are secured underneath to a suitable portion of, or addition to, the fixed frame 30.

The actuation force, whereby the housing 32, together with the blade 25, are pressed at right angles to the belt 20, is provided by the rams 60. The drag forces on the blade and on the housing, which act in the direction parallel to the belt, are supported by means of arms 63, which are unitary with the covers 50. The arms 63 are coupled to suitable pivot points 65 on the fixed frame, whereby the housing 32 can freely follow movements at right angles to the belt 20, such movement being under the force of the actuation rams 60, but the housing is constrained against movement longitudinally with respect to the belt.

It will be noted that the housing 32 in FIGS. 1–3, because of the solid arms 63 rigidly attached to the housing, cannot undergo motion in the Roll sense: that is to say, rotation of the housing about an axis parallel to the direction of motion of the belt. It is advantageous that this Roll motion is prevented by the arms; if Roll were permitted by the arms, the condition would not be self-correcting, and any unevenness of wear of the blade would cause the housing to tilt, and the tilt to get progressively worse.

The use of the arms 63 to support the drag forces leads to very low friction. Only the pivot points 65 are available as possible sources of friction, apart from whatever friction is inherent in the rams 60. When the rams are of the kind used in air-suspension systems, the rams, like the pivot points 65, are substantially frictionless.

Therefore, the housing 32 may bounce towards and away from the belt 20 in a hysteresis-free manner. The actuation force, as supplied by the rams 60, remains constant (or very nearly constant) during bouncing, during both the bounce phase and the rebound phase.

It may be noted that during bouncing and rebounding of the housing 32, the blade 25,34 remains solid with the housing: that is to say, there is no movement of the blade relative to the housing. The water within the housing also moves in unison with the housing and the blade; the water, too, is in effect "solid" with the housing, being not required to flow into or out of the housing during actuation.

Figure 4:
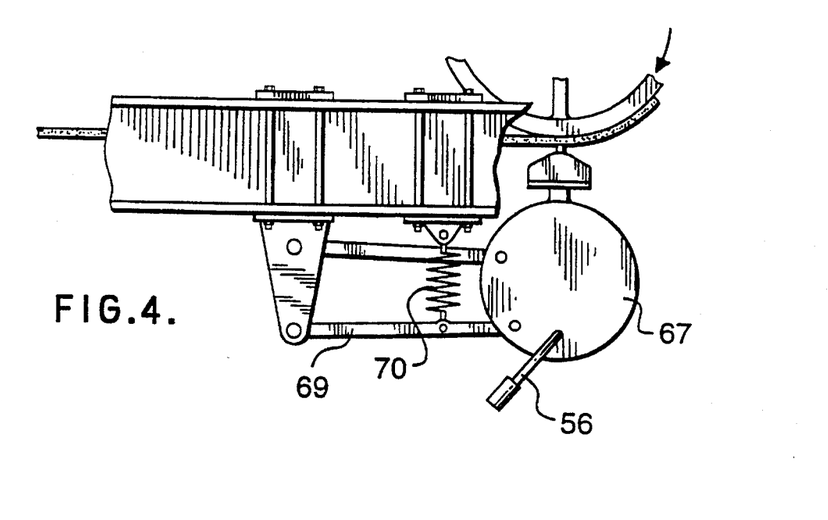
FIG. 4 is an end elevation of another belt scraper assembly.

FIG. 4 shows an alternative manner in which the housing can be supported for hysteresis-free bouncing and rebounding. In FIG. 4, the housing 67 is constrained for vertical movement by being mounted on two parallel suspension arms 69, pivoted at both ends. This may be contrasted with the arms 50 of FIG. 3.

In FIG. 4, another difference over FIG. 3 is that the actuation force is provided by springs 70, as distinct from the pneumatic rams 60. Springs also can be readily arranged to be hysteresis-free.

As the blade wears, the housing 32 gradually approaches close to the belt 20. The apparatus includes an automatic adjuster, whereby a charge of water is injected into the housing, to push the housing 32 back, when the housing gets too close to the belt. The operational components of the adjuster are shown schematically in FIG. 5.

As the housing approaches the belt, due to wear of the blade, a probe 72 which is attached to the housing 32 finally contacts a datum point, which in this case comprises the stem 74 of a pneumatic valve, and trips the valve. When this happens, air is supplied, via the circuit shown in FIG. 5, to a conventional air-over-hydraulic unit 76. When activated, this unit automatically cycles itself, a pneumatic piston/cylinder being used to pressurise a hydraulic piston/cylinder. (This is not described as the unit itself is conventional.)

Figure 5:
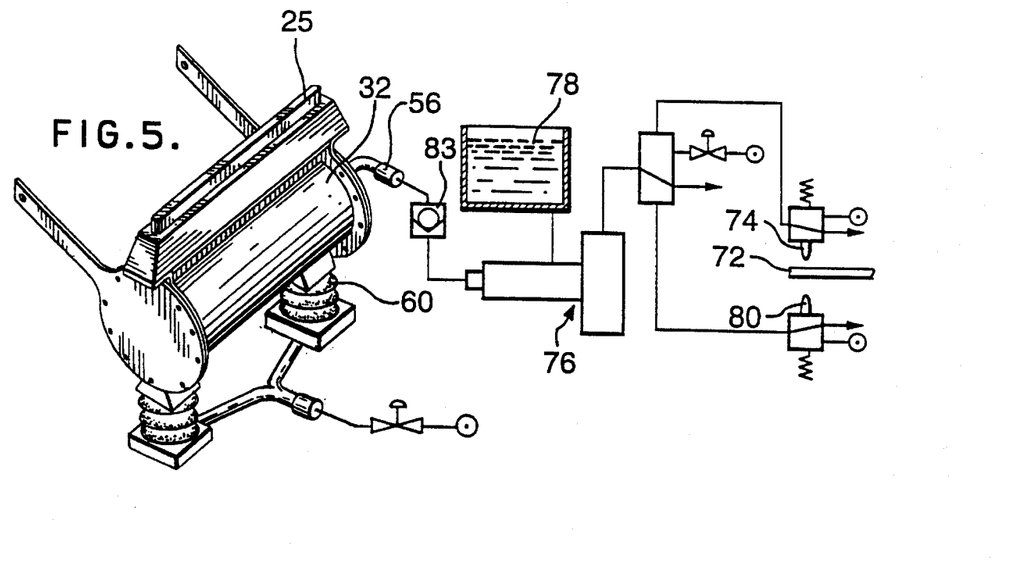
FIG. 5 is a diagram of a circuit which is used with the assembly of FIG. 1.

The unit 76 therefore pumps water from a reservoir or tank 78 through the coupling 56 and into the housing 36. The unit carries on pumping until the housing has been pushed far enough back that the probe 72 now contacts the stem 80 of a second pneumatic valve. This shuts off the air supply to the air-over-hydraulic unit 76. The unit 76 then remains OFF until, after the blade 25 wears some more, the probe 72 once again trips the stem 74 of the first valve. A non-return check valve 83 prevents water that has been injected into the housing 32 from being released during operation of the scraper.

In order for it to inject the water into the housing, the air-over-hydraulic unit 76 has to be capable of generating sufficient pressure to overcome the pressure of the water already in the housing, which is determined by the actuation force. The air pressure fed to the unit 76 must be high enough to make sure the resulting hydraulic pressure is enough to overcome the actuation-induced pressure inside the housing.

Adjustment takes place as water is injected into the housing 32, because the blade 25 is forced out of the slot 38 in the housing in exact correspondence volumetrically with the water being injected. The blade 25 itself serves as a piston, in the manner explained in detail in U.S. Pat. No. 4,877,122.

It has been explained that the housing bounces and rebounds due to passing variations in the thickness of the belt, and due to pebbles etc adhering especially strongly to the belt. It will be noted, in the scraper assembly described above, that the blade 25 is not called upon to slide in and out of the seal 70 during bounce and rebound. If the nature of the scraper apparatus were such that such movement of the blade in the seal was required to take place during bounce and rebound, that would be a substantial disadvantage.

In the scraper as described, the blade and the housing move in unison during bounce and rebound. To be sure, the blade is required to slide relative to the seal 40 in the housing during adjustment, but the adjustment movement is unidirectional, not reciprocating, and in any case the engineer sees to it that the pressure supplied to the water is ample to overcome whatever friction the seal 40 might inflict on the blade during an adjustment movement.

It should be noted that it would be rather difficult to use air or some other gas in place of the water inside the housing.

Water is incompressible, and therefore the water may be regarded as serving the function of a solid mechanical strut, to transmit the actuation forces solidly between the housing and the blade. A gas on the other hand, of course is resiliently compressible, and its use in the housing would allow the housing to suffer all kinds of damaging vibrations and spurious movements, including the stroking of the blade through the seal.

The invention is aimed at providing a hysteresis-free suspension movement for the housing 32, with the blade 25 constrained, during operation, against movement relative to the housing. In this manner, the blade can "conform" closely with the passing thickness of the belt 20. In the scraper described, for adjustment purposes the blade is forced out of the housing under hydraulic pressure, and by hydraulic displacement.

In the preferred belt scraper apparatus as described, there are two modes of movement: one is the actuation movement of the housing and blade (and the water) together as a unit under the constant actuation force, and the other is the one-slot adjustment movement where the blade is pushed out of the housing in a substantially sudden manner.

In the invention, other manners of providing these two movements also are contemplated.

In FIG. 6, a coil of scraper blade material 85 resides within a housing 87. The housing 87 may be mounted for bouncing and rebounding on a suspension system such as that illustrated in the previous drawings. In FIG. 6, the blade 85 is advanced forwards for adjustment purposes by means of the pinch roller 89. The pinch roller, during normal operation, is on a ratchet 90, so that the blade 85 cannot retract away from the belt, back into the housing 87. When adjustment is required, as determined by a suitable sensor, an air-driven ram 92, provided for the purpose, drives the pinch roller 89 into rotation through a suitable arc, thereby advancing the blade 85 out of the housing 87. Then, the pinch roller, having ratcheted around to a new position, locks up again, and prevents the blade from retracting into the housing.

As mentioned, the actuation force on the housing can be provided by means of resilient springs, in contrast to the pneumatic rams. Another alternative is to use weights to urge the housing and the blade against the belt.

In the scrapers described, the position of the point of contact of the blade to the belt, in relation to the location of the end pulley, is important, as will not be explained.

Conventionally, it has usually been arranged that the blade does not press against the belt directly onto the pulley. It would be advantageous if the blade could press the belt directly onto the solidness of the pulley, since that would permit the contact force to be large. However, it is usually found that the variations in thickness of the moving belt are too disruptive for the blade to be allowed to be in directly-in-line reactive contact with the pulley: if the blade is allowed to push directly-in-line against the pulley, the blade and its actuation mechanism are then subjected to what amounts to a violent hammering.

Therefore, it is the usual practice to locate the blade a few cm away from the pulley, along the slack of the return run 27. Here, the belt itself can move up and down a little, and the variations in thickness of the belt therefore are not transmitted so violently into a retractive movement of the blade.

On the other hand, away from the end-pulley, the blade-to-belt contact force inevitably must be reduced, the further the blade is located from the pulley.

It is an aim of the suspension system as now described to permit the blade to be located close to the pulley, or even directly in-line with the pulley. This improvement is possible because the suspension system as described does not convert variations in the thickness of the belt into such violent hammer blows on the blade. As explained, the new suspension therefore permits the blade-to-belt contact force to be reacted solidly through the pulley (and the bearings thereof), which allows the contact force to be large. The reason the new suspension system permits the blade to be so close to the pulley is that the blade can retract very smoothly, and substantially without friction or hysteresis, and during retraction the blade contact force remains substantially constant.

Figure 7:
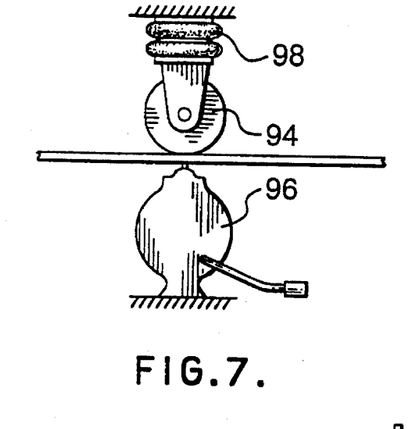
FIG. 7 is an end elevation of still another belt scraper assembly.

FIG. 7 shows that in fact it need not be the existing end-pulley 23 of the conveyor system which reacts the actuation force of the scraper blade. (As mentioned, the reaction to the actuation force can be supported, at least partly, by the tension in the belt, the scraper blade being positioned some distance away from the pulley.)

Rather, a backing pulley 94 can be specifically provided for the scraper, if so desired. As shown in FIG. 7 also, the housing 96 may be mounted solidly to the fixed frame, and the actuation forces may be applied to the backing pulley 94. The backing pulley is the component new that is carried on a hysteresis-free suspension and actuation system 98. For adjustment purposes, a length of blade material is forced out of the fixed water-filled housing from time to time, by an adjustment system such as that shown in FIG. 5.

The water tank 78 (FIG. 5) should be large enough to contain all the water needed to fill the housing when the blade is (almost) fully worn out. Of course, precautions should be taken to prevent the water freezing. The water tank may be mounted on the fixed frame of the conveyor belt.

The air supply for the circuit of FIG. 5 may be derived from a central pneumatic pressure source if such is available. If electrical power only is available, an electric motor may be used to power an air compressor; or an engine, with a stored fuel supply, may be used for that purpose. If desired, compressed air stored in a bottle may be used. It may be noted that it is only during adjustment, and not during normal actuation, that compressed air is consumed in the apparatus, so that a bottle of compressed air may be expected to last for months.

Figure 5A:
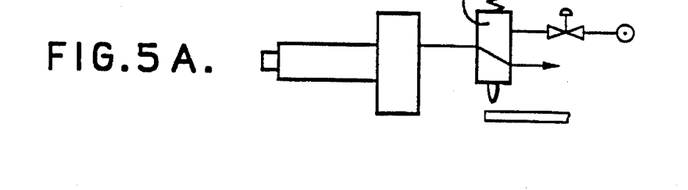
FIG. 5A shows a variation to the circuit of FIG. 5.

FIG. 5A shows a simpler version of the pneumatic circuit and components. Here, the height control circuit is replaced by a single valve 86. The valve 86 is the kind of valve commonly used as a height control valve on automotive air suspension systems. In fact, this type of valve is particularly suitable, as it has been tested at length in harsh environments.

It may be considered that such a simple valve arrangement as shown in FIG. 5A is inappropriate, in that, should the adjuster be subjected to a sudden gross excursion of movement, the valve will "read" such movement as wear, and will over-adjust the adjuster. However, the height control valve 86 incorporates a time delay, whereby air pressure is transmitted through the valve only after the valve stem has been depressed for a few seconds. As a result of the delay, the adjuster will ignore short-lived spikes of movement of the belt, and will not over-adjust.

Although the control of the quantity of water in the housing is done pneumatically, as described, the invention is not limited only to pneumatic control. An electric pump, for example, operating in response to an electrically-derived signal that adjustment is required, may be used, to force a charge of water into the housing.

Figure 5B:
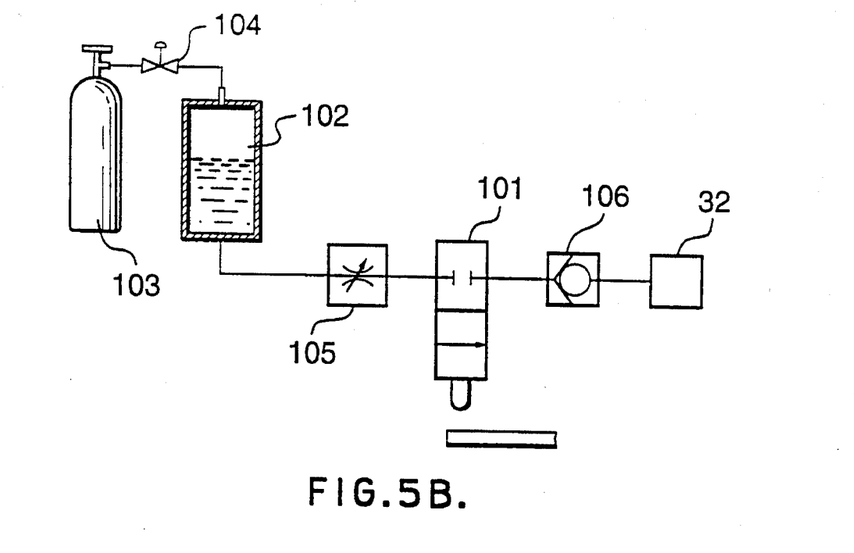
FIG. 5B shows another variation in the circuit.

FIG. 5B shows another arrangement by which the adjustment water may be supplied to the housing. Again, the supply of water to the housing 32 is controlled via a conventional height control valve 101, of the kind used in truck suspension systems.

In FIG. 5B, water is supplied to the valve 101 from an accumulator 102, in which the water is stored under pressure. The pressure in the accumulator 102 comes from a storage bottle 103 of compressed gas (air, nitrogen, etc). The pressure in the bottle may be, typically 2000 psi a pressure regulator 104 keeps the pressure in the accumulator 102 at a steady 250 psi or so. This pressure is high enough that, when the valve 101 opens, water is forced into the housing 32. A flow regulator 105 prevents water from surging into the housing too rapidly.

The system of FIG. 5B is very simple in the sense of having few moving parts, and using standard conventional components. The simplicity also arises because of the absence of need for a pump. The accumulator 102 has enough volume to store all the water that will be needed to fill the housing as the blade wears out.

As mentioned, the pressure in the accumulator should be high enough to force the water into the housing against the actuation force. Alternatively, it may be arranged that the actuation force can be reduced momentarily while the adjustment water is being injected into the housing. In either case, a non-return valve 106 prevents water, once injected into the housing, from passing out therefrom.

It was mentioned in relation to FIG. 3 that it is in most cases important that the housing not be allowed to articulate in the Roll-mode. If the housing were permitted to undergo Roll-mode movement, then, if the blade should tend to wear more on the left than on the right, the housing would start to lean over, and there would be no restoring force to correct that tendency. To avoid that, it is preferred that the housing be constrained against Roll-mode movement, i.e., that the housing and arms can move towards and away from the belt only as a unitary rigid body: this forces the blade to remain straight, even if the blade tends to wear more on the left than on the right.

One way in which the designer can constrain the housing against Roll-mode movement is to ensure that the housing is attached to the suspension arms as rigidly as possible. The housing itself is an inherently rigid structure, and it is easy for the designer to make the arms also adequately rigid. It remains, therefore, for the designer to make the point of attachment of the housing to the arm also very rigid. This can, however, pose a problem, because it is desirable that the housing have at least some small degree of adjustability with respect to the arms.

The need for adjustability of the housing with respect to the arms may be explained as follows. The suspension arms (63 in FIG. 1) are constrained by pivots 65: the pivots 65 are built into suitable brackets, which are attached to the fixed frame of the conveyor belt. Sometimes, the technician will assemble the left and right pivot points 65 both at exactly the same height with respect to the belt. However, the prudent designer will wish to allow for the possibility that pivot points may be installed at different heights, and in some cases a height difference of a centimeter or more cannot be ruled out. It may be noted that the technician when bolting or welding the left side bracket onto the frame girder (30 in FIG. 1) in many cases will not even be able to see the right side bracket, far less be able to align the pivot points with any accuracy.

It is important that the housing be set up such that the buttress piece (eg piece 43 in FIG. 2) lies quite close to the belt, using operation. The closer to the belt the buttress of the housing can be placed (it must never, of course, be allowed to actually touch the belt) the greater the control over the scraping end of the blade. If the blade were allowed to protrude too far from the housing, the blade might curl over, or otherwise become unstable.

Therefore, the designer wishes to run the housing as close to the belt as possible, but without actually touching the belt. One of the key factors in reducing the allowance-distance by which the buttress must be clear of the belt is to ensure that the housing is straight with respect to the belt. Every effort should be made, therefore, to make sure that if the buttress is to be 2 mm clear of the belt on the left side of the belt, then it should be 2 mm, and not 3 or 4 mm (and certainly not 1 mm), clear on the right side.

Because it is not practical, as explained, to provide such accuracy simply by precision manufacturing and assembly, over a belt width of 1 meter or more, the designer should make the housing adjustable relative to the arms. The designer should make it possible that when the arms are assembled to their pivots, and the housing is attached to the arms, that the left side of the housing can be adjusted for height relative to the right side, and that the adjustment can be locked-in rigidly.

Even if the brackets could be assembled to the frame girders with the pivot points were at exactly the same height, the possibility remains that the girders themselves might not be quite straight.

For these many reasons, therefore, the housing should be made adjustable relative to the arms. On the other hand, the manner of providing such adjustment should be such that, when adjustment is completed, the arm is locked very rigidly to the housing.

Another point the designer will wish to bear in mind is that the structural layout of conveyor belt frames of course vary a great deal. Some frames provide handy surfaces for attaching the brackets in more or less the ideal place, whereas other frames provide only very awkward attachment access. The requirement for the housing to be precisely straight, so that it can be allowed to be close to the belt, and the requirement for the housing to be attached very rigidly to the arms, to guard against Roll-mode movement, are no less important just because the conveyor belt fixed frame happens to be of an awkward shape.

Thus, an important factor as regards the manner in which the arms are attached to the fixed frame, is that the manner of attachment should preferably be very versatile in accommodating awkwardly shaped conveyor belt frames.

Figure 8:
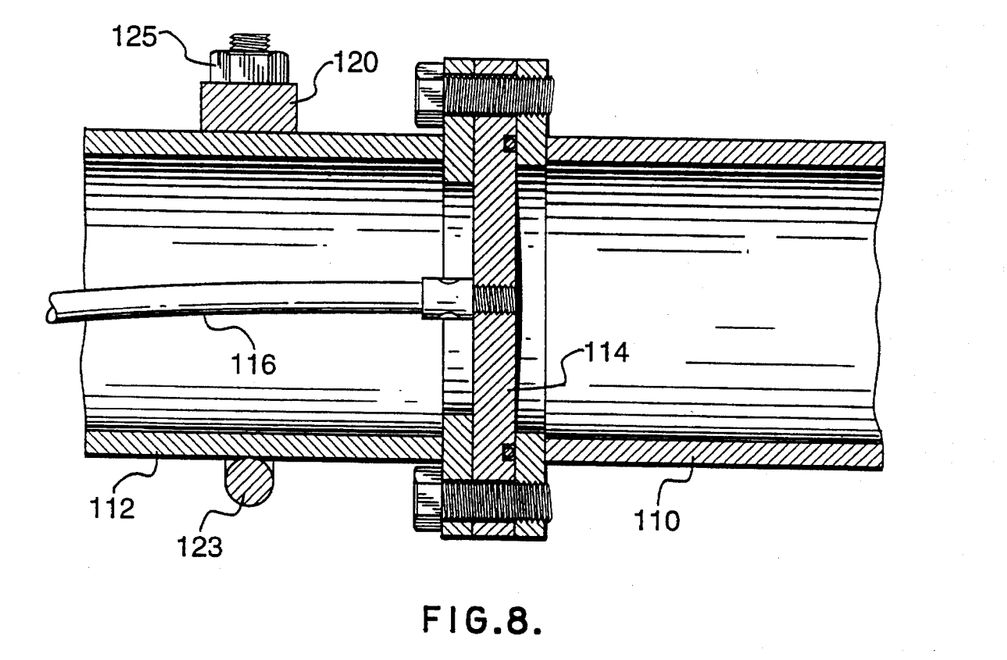
FIG. 8 is a view taken along the direction of travel of the belt of a modified form of scraper.

FIG. 8 shows a manner of attaching the housing to the suspensions arms, which (a) permits the housing to be adjusted during set-up as to its operational position with a fine degree of precision, and yet which (b) provides an immensely rigid attachment between the housing and the arms, and yet again which (c) is versatile enough that it can be attached to many different kinds of fixed frames.

In FIG. 8, the housing 110 is provided with a plain cylindrical extension 112. A similar extension is provided at the other end of the housing unit. The extension is flange-bolted to the housing.

The outer end of the extension 112 is open, to allow access to the cover 114. The cover 114 may be of perspex, whereby a technician may inspect the inside of the housing, to determine whether the coiled blade is worn down, and to inspect the status of the water inside the housing.

A pipe 116 allows water to be pumped into the housing 110 for adjustment purposes, during operation, in the manner as described.

Figure 9:
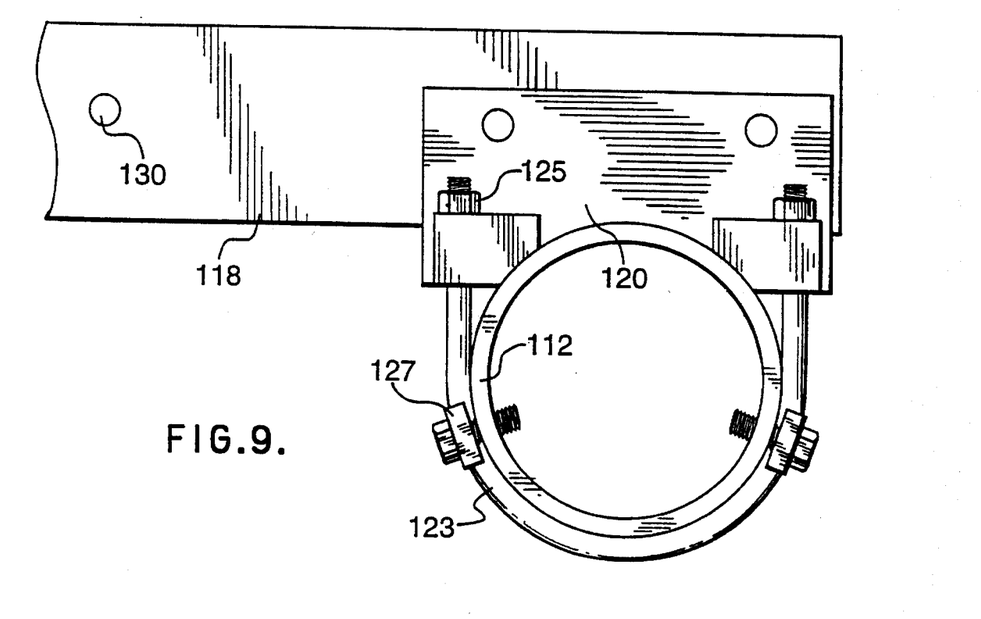
FIG. 9 is an end elevation of the scraper of FIG. 8.

As shown in FIG. 9, each suspension arm 118 carries a receptacle 120 whereby the extension 112 can be attached to the arm. The extension is held in the receptacle by means of a U-bolt 123, and nuts 125.

The U-bolt 123 carries lugs 127, which are welded onto the shank of the U-bolt. Bolts passing through the lugs 127 are screwed into suitably positioned tapped holes in the extension 112. As the nuts 125 are turned, ie backed off or tightened, the extension, and with it the end of the housing, is caused to rotate slightly with respect to the receptacle in the arm 118. By adjusting the U-bolt nuts 125 on the extensions on both sides of the housing, the housing can be manipulated very precisely as regards its straightness with respect to the belt. It may be noted that the fact that the lugs are attached to the U-bolt means that the housing can be manipulated without the need for heavy lifting by the operator.

Once the housing is settled into position where it lies exactly straight with respect to the belt, the nuts 125 are tightened, whereby the U-bolts draw the extension firmly into the receptacle, and thereby the extension is attached very firmly and rigidly to the suspension arm.

The U-bolt 123 may encircle the extension 112 at any point axially along the length of the extension. Therefore, the exact spacing apart of the girders of the fixed frame is of little concern, since the U-bolts will just be positioned accordingly. Therefore in turn, the attachment brackets 129 which carry the left and right suspension arm pivots 130 have no need, in themselves, to be versatile as regards the spacing apart of the pivots. This greatly simplifies the structure of the pivots, and the structure of the brackets, which can in fact simply be flat plates which bolt flat onto the sides of the girders.

FIGS. 10A, 10B, 10C, 10D show how a single configuration of bracket, pivot, suspension arm, and housing, can provide great versatility as to positions. The scraper blade 134 is arranged to scrape upwards against a conveyor belt which is traversing horizontally across the top of the blade. (The belt itself is not shown in FIGS. 10A–D, and nor is the fixed frame to which the scraper is attached.)

The scraper blade housing 136 is attached to the receptacle 138 by means of U-bolts 140, which engage the cylindrical extension 139 of the housing 136. The receptacle 138 is bolted to one end of the suspension arm 143.

The suspension arm 143 is pivoted point 145, to the mounting bracket 147. The mounting bracket 147 is bolted (or in some cases welded) to the girders of the fixed frame, near the head pulley, or as required.

The actuator of the scraper of FIGS. 10A–D comprises a pressurise-able air-spring unit 149, which is mounted so as to exert actuation force on the suspension arm, and to react that force against the bracket 147. A damper unit 150 serves to damp out the bounce and rebound motions the housing might undergo.

Figure 10A:
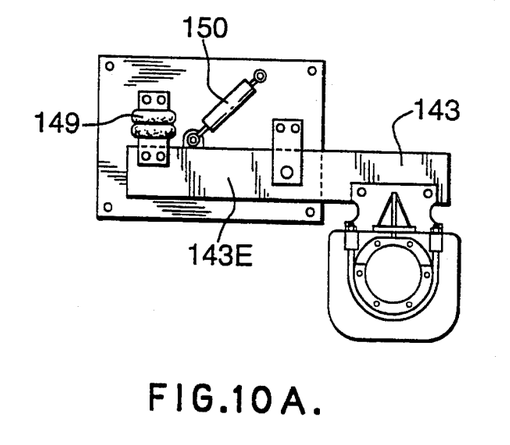
FIGS. 10A, 10B, 10C, and 10D are diagrams of some possible arrangements of the components of the belt scraper.
Figure 10B:
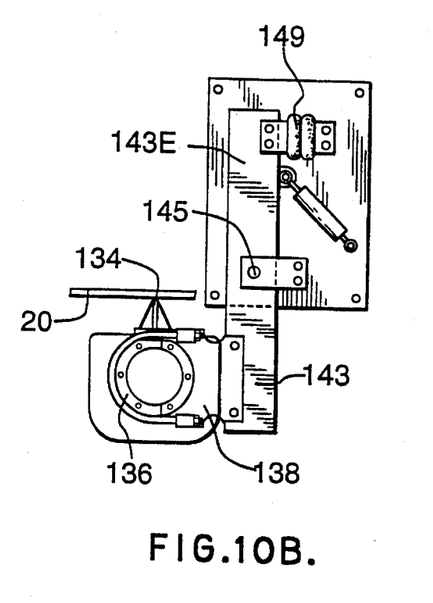
Figure 10C:
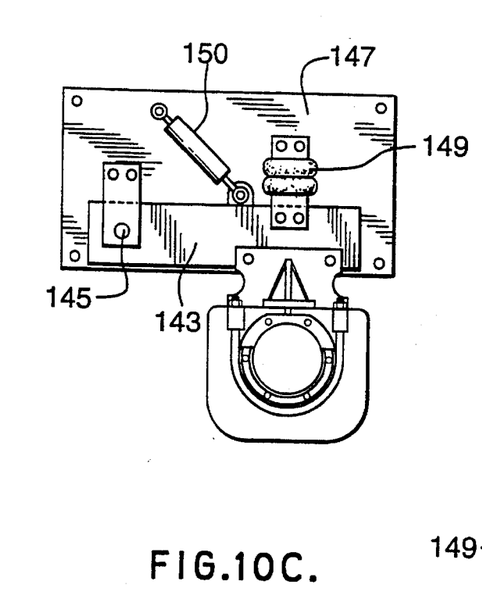
Figure 10D:
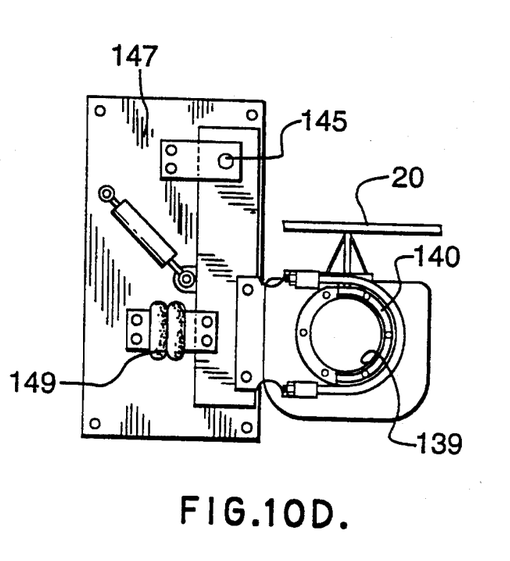

As may be observed, the actuator can be arranged in a number of ways. The inflatable air-spring unit 149 can be arranged in either Push or Pull mode: the unit Pushes in FIGS. 10A and 10D, and Pulls in FIGS. 10B and 10C. In FIGS. 10A and 10B, an extension 143E of the arm 143 extends beyond the pivot point 145, and the air spring 149 acts on the extension. In FIGS. 10C and 10D, the air spring 149 acts, through the arm 143, directly in a line with the housing 136; this is an advantage because the bending moment experienced by the arm 143 is then negligible.

It will be understood that no matter what the layout of the girders, the arrangement is versatile enough that the bracket 147 can be made to fit the girders. Variations in the layout of the girders in the plane at right angles to FIGS. 10A–D are accommodated, in that the U-bolts 140 can be clamped to the cylindrical extension 139 of the housing at any point along the length of the extension.

I claim:

1. Conveyor belt scraper apparatus, for use with a conveyor belt (120) which is travelling with respect to a fixed frame (30), characterised in that:
   the apparatus is so structured as to be suitable for use with a conveyor belt which includes structural means such as pulleys to support the belt;
   the apparatus includes a scraper blade (25), and the blade is arranged for direct scraping contact with the belt;
   the apparatus includes a housing (32), and the blade is mounted in the housing;
   the apparatus includes an operable actuator (60), for urging the housing and the belt towards each other with an actuation force;
   the apparatus includes structural means connecting the actuator to the housing;
   the apparatus includes a suspension means (63), which is suitable for mounting on the fixed frame;
   the suspension means is effective to provide guided suspension travel movement relatively between the belt and the housing, in the direction towards and away from each other and is effective to enable the actuation force to be maintained between the housing and the belt during said suspension movement, whereby the distance of the housing from the belt varies, during operation, the variable distance being termed distance D;
   the apparatus includes an operable adjuster (76), which is suitable for adjusting the position of the blade relative to the housing, in the direction towards the belt;
   the apparatus includes a distance sensor, for sensing and signalling when the distance D between the housing and the belt becomes less than a predetermined datum distance D1;
   the apparatus includes a means for operating the adjuster, which operates the adjuster automatically in response to the signal from the distance sensor that the housing has approached the belt closer than the predetermined datum distance D1;
   the arrangement of the adjuster in the apparatus is such that the adjuster is effective, when operated, to move the blade out of the housing, towards the belt, a predetermined adjustment distance D2, thereby increasing the distance D of the housing from the belt by the predetermined distance D2.

2. Apparatus of claim 1, wherein:
   the suspension means includes means for providing guided suspension travel movement of the housing relative to the fixed frame, in the direction towards and away from the belt, and is effective to constrain the housing against movement of the housing along the length of the belt;
   and the actuator is effective to provide an actuation force urging the housing towards the belt.

3. Apparatus of claim 2, wherein:
   the suspension means includes left and right suspension arms;
   the arms are arranged for swinging relative to the fixed frame of the conveyor, about left and right pivot points defining a pivot axis;
   the apparatus includes left and right attachment means for attaching the arms to ends of the housing, the nature of the attachment means being such that the left arm is attached rigidly to a left end of the housing, and the right arm is attached rigidly to a right end of the housing;

whereby the arms and the housing swing, during suspension movement, about the pivot axis as a rigid, unitary whole structure.

4. Apparatus of claim 3, wherein the left attachment means includes a means for setting and adjusting the orientation of the left arm relative to the left end of the housing, and for locking-in a set orientation.

5. Apparatus of claim 3, wherein the attachment means comprise a means for attaching the arms to the ends of the housing which is so arranged as to permit the arms to be attached over a range of axial locations of the ends of the housing.

6. Apparatus of claim 3, wherein at least one of the ends of the housing comprises a cylinder, and the arm includes a tightenable clamp for clamping around the cylinder, and the arrangement of the cylinder and the clamp is such that the cylinder can be adjusted as to its angular orientation by being rotated within the clamp, and can be adjusted as to its axial position by axial movement thereof within the clamp, and the orientation and axial position of the cylinder relative to the arm are locked-in rigidly upon tightening the clamp.

7. Apparatus of claim 1, wherein the adjuster, when operated, is effective to advance the blade the said predetermined adjustment distance D2 in a substantially sudden manner.

8. Apparatus of claim 1, wherein the apparatus includes a blade mounting means, which is effective to mount the blade with respect to the housing in such a manner that, except when the adjuster is operated, the blade mounting means constrains the blade against movement of the blade relative to the housing in the direction away from the belt.

9. Apparatus of claim 1, wherein the actuator and the suspension means are effective to maintain substantially constant the actuation force on the housing, in a substantially hysteresis-free manner, and substantially irrespective of the distance of the housing from the belt.

10. Apparatus of claim 1, wherein the adjuster is effective, when operated, to advance the blade with respect to the housing substantially without interruption to the continuing operation of the actuator.

11. Apparatus of claim 1, wherein:
the housing includes a hollow chamber, and the blade is housed within the hollow chamber;
the housing includes a slot, and the blade protrudes from the slot;
the apparatus includes a fluid-tight seal at the slot which is effective to seal the blade to the housing;
and the space within the hollow chamber not occupied by the blade is filled with a liquid.

12. Apparatus of claim 11, wherein the adjuster includes an factor, which is effective to inject, upon operation of the adjuster, a charge of liquid under pressure into the hollow chamber, whereby the charge of liquid entering the chamber displaces from the chamber, and through the slot, a portion of the blade, being a portion of the blade having a volume equal to that of the charge of liquid injected;
whereby the adjustment distance D2 is the distance of movement of the blade out of the housing produced by the injection of that volume charge of liquid.

13. Apparatus of claim 11, wherein the hollow chamber is provided with a check valve means, which is effective, when the actuator is in operation, to prevent liquid passing out of the hollow chamber.

14. Apparatus of claim 1, wherein:
the housing includes a slot, and the blade protrudes from the slot;
the apparatus includes a pair of pinch rollers, which are arranged for pinching the blade therebetween;
the adjuster includes an operable drive means for driving the rollers in rotation, the drive means being effective, when operated, to advance the blade out of the slot;
and the adjuster includes a means for operating the drive means for incremental rotation of the rollers.

15. Apparatus of claim 1, wherein:
the apparatus includes a reaction member, which is suitable for placement on the opposite side of the belt from the housing, and is suitable for providing a reaction to the said actuation force urging the housing and the belt towards each other;
the suspension means includes means for providing guided suspension travel movement of the reaction member relative to the fixed frame, in the direction towards and away from the belt, and is effective to constrain the reaction member against movement of the housing along the length of the belt;
the actuator is effective to provide an actuation force urging the reaction member towards the belt;
the housing is adapted to be fixed to the fixed frame, in a manner whereby no movement of the housing in the direction towards the belt, relative to the fixed frame, can take place during operation of the scraper.

16. Apparatus of claim 1, wherein the arrangement of the adjuster in the apparatus is such that the adjuster operating means remains unoperated, and is effective to keep the blade unadjusted relative to the housing, so long as, during operation, the housing does not approach the belt closer than the predetermined datum distance D1.

* * * * *